United States Patent
Dai et al.

(10) Patent No.: US 8,335,403 B2
(45) Date of Patent: Dec. 18, 2012

(54) SOFT EDGE SMOOTHNESS PRIOR AND APPLICATION ON ALPHA CHANNEL SUPER RESOLUTION

(75) Inventors: Shengyang Dai, Evanston, IL (US); Mei Han, Cupertino, CA (US); Wei Xu, Los Gatos, CA (US); Ying Wu, Vernon Hills, IL (US); Yihong Gong, Saratoga, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 1071 days.

(21) Appl. No.: 11/869,906

(22) Filed: Oct. 10, 2007

(65) Prior Publication Data

US 2008/0267525 A1 Oct. 30, 2008

Related U.S. Application Data

(60) Provisional application No. 60/867,259, filed on Nov. 27, 2006.

(51) Int. Cl.
*G06K 9/32* (2006.01)

(52) U.S. Cl. ........ 382/299; 382/266; 382/274; 382/275; 358/3.26; 358/3.27; 358/463

(58) Field of Classification Search ................ 382/260, 382/274, 275, 299, 266; 358/3.26, 3.27, 358/463
See application file for complete search history.

(56) References Cited

U.S. PATENT DOCUMENTS

| | | | | |
|---|---|---|---|---|
| 6,781,585 B2* | 8/2004 | Naegle et al. | ................. | 345/501 |
| 6,940,563 B2* | 9/2005 | Ishihara | ....................... | 348/738 |
| 7,106,322 B2* | 9/2006 | Deering | ....................... | 345/419 |
| 7,129,976 B2* | 10/2006 | Jaspers | ....................... | 348/272 |
| 7,474,308 B2* | 1/2009 | Deering | ....................... | 345/419 |
| 7,508,504 B2* | 3/2009 | Jin et al. | ....................... | 356/237.4 |
| 7,889,270 B2* | 2/2011 | Yamada et al. | ................ | 348/346 |
| 8,233,744 B2* | 7/2012 | Tezuka | ....................... | 382/298 |
| 2002/0176120 A1 | 11/2002 | O'Callaghan | | |

OTHER PUBLICATIONS

Chang, H. et al., "Super-Resolution through Neighbor Embedding", Computer Vision and Pattern Recognition, 2004, CVPR 2004, Proceedings of the 2004 IEEE Computer Society Conference on Publication Date: Jun. 27-Jul. 2, 2004, pp. I-275 thorugh 282, vol. 1.

Li, X. et al., "New Edge-Directed Interpolation", Image Processing, IEEE Transactions on Publication Date, Oct. 2001, vol. 10, issue 10, pp. 1521-1527.

J. Allebach and P. W. Wong. Edge-directed interpolation. In ICIP, 1996.

S. Baker and T. Kanade. Limits on super-resolution and how to break them. IEEE Trans. on PAMI, 24(9):1167-1183, 2002.

E. P. Bennett, M. Uyttendaele, C. L. Zitnick, R. Szeliski, and S. B. Kang. Video and image bayesian demosaicing with a two color image prior. In ECCV, 2006.

C. M. Bishop, A. Blake, and B. Marthi. Super-resolution enhancement of video. In Proc. Artificial Intelligence and Statistics, 2003.

(Continued)

*Primary Examiner* — Yosef Kassa
(74) *Attorney, Agent, or Firm* — Bao Tran; Joseph Kolodka

(57) ABSTRACT

Systems and methods are disclosed for processing a low resolution image by performing a high resolution edge segment extraction on the low resolution image; performing an image super resolution on each edge segment; performing reconstruction constraint reinforcement; and generating a high quality image from the low quality image.

23 Claims, 11 Drawing Sheets

OTHER PUBLICATIONS

Y. Boykov and V. Kolmogorov. Computing geodesics and minimal surfaces via graph cuts. In ICCV, 2003.

Y. Boykov and V. Kolmogorov. An experimental comparison of mincut/max-flow algorithms for energy minimization in vision. IEEE Trans. on PAMI, 26(9):1124-1137, 2004.

Y. Boykov, O. Veksler, and R. Zabih. Fast approximate energy minimization via graph cuts. IEEE Trans. on PAMI, 23(11):1222-1239, 2001.

F. Champagnat, G. L. Besnerais, and C. Kulcsar. Continuous super-resolution for recovery of 1-d image features: Algorithm and performance modeling. In CVPR, 2006.

T. F. Chan, S. Osher, and J. Shen. The digital tv filter and nonlinear denoising. IEEE Trans. on Image Processing, 10(2):231-241, 2001.

H. Chang, D. Yeung, and Y. Xiong. Super-resolution through neighbor embedding. In CVPR, 2004.

M. Elad and A. Feuer. Restoration of single super-resolution image from several blurred, noisy and down-sampled measured images. IEEE Trans. on Image Processing, 6(12):1646-1658, 1997.

S. Farsiu, M. Elad, and P. Milanfar. Multi-frame demosaicing and super-resolution of color images. IEEE Trans. on Image Processing, 15(1):141-159, 2006.

S. Farsiu, M. D. Robinson, M. Elad, and P. Milanfar. Fast and robust multiframe super resolution. IEEE Trans. on Image Processing, 13(10):1327-1344, 2004.

W. T. Freeman, T. R. Jones, and E. C. Pasztor. Example-based super-resolution. IEEE Computer Graphics and Applications, 2002.

W. T. Freeman, E. Pasztor, and O. Carmichael. Learning low-level vision. IJCV, 40(1):25-47, 2000.

X. C. He and N. Yung. Curvature scale space corner detector with adaptive threshold and dynamic region of support. In ICPR, 2004.

M. Irani and S. Peleg. Motion analysis for image enhancement: resolution, occlusion and transparency. JVCIP, 1993.

D. Kong, M. Han, W. Xu, H. Tao, and Y. Gong. Video superresolution with scene-specific priors. In BMVC, 2006.

A. Levin, D. Lischinski, and Y. Weiss. A closed form solution to natural image matting. In CVPR, 2006.

X. Li and M. Orchard. New edge-directed interpolation. IEEE Trans. on Image Processing, 10(10):1521-1527, 2001.

Z. Lin and H.-Y. Shum. Fundamental limits of reconstruction based super-resolution algorithms under local translation. IEEE Trans. on PAMI, 26(1):83-97, 2004.

C. Liu, H.-Y. Shum, and C.-S. Zhang. A two-step approach to hallucinating faces: Global parametric model and local nonparametric model. In CVPR, 2001.

B. S. Morse and D. Schwartzwald. Image magnification using level set reconstruction. In CVPR, 2001.

V. Rabaud and S. Belongie. Big little icons. In CVAVI, 2005.

L. Rudin, S. Osher, and E. Fatemi. Nonlinear total variation based noise removal algorithms. Physica D, 60:259-268, 1992.

J. Sun, N. Zheng, H. Tao, and H. Shum. Image hallucination with primal sketch priors. In CVPR, 2003.

Y.-W. Tai, W.-S. Tong, and C.-K. Tang. Perceptually-inspired and edge-directed color image super-resolution. In CVPR, 2006.

M. F. Tappen, B. Russell, and W. T. Freeman. Exploiting the sparse derivative prior for super-resolution and image demosaicing. In IEEE Workshop on Statistical and Computational Theories of Vision, 2003.

Q. Wang, X. Tang, and H. Shum. Patch based blind image super resolution. In CVPR, 2005.

* cited by examiner

Using different size neighborhood:

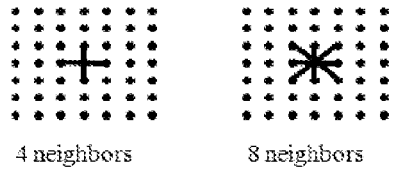

4 neighbors      8 neighbors

Getting different distance maps:

4 neighbors     8 neighbors     128 neighbors

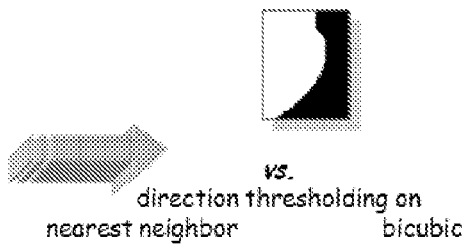

vs.
direction thresholding on
nearest neighbor     bicubic

Objective function:

$$E(L) = \min_{L}\left(\sum_{p} \exp\left(-\left(\frac{l_p - \alpha_p}{\sigma^2}\right)^2\right) + \beta \sum_{k} \sum_{\{p,q\} \in x_k} |l_p - l_q| \cdot \frac{\delta^2 \Delta \theta_k}{2|e_k|}\right)$$

FIG. 5

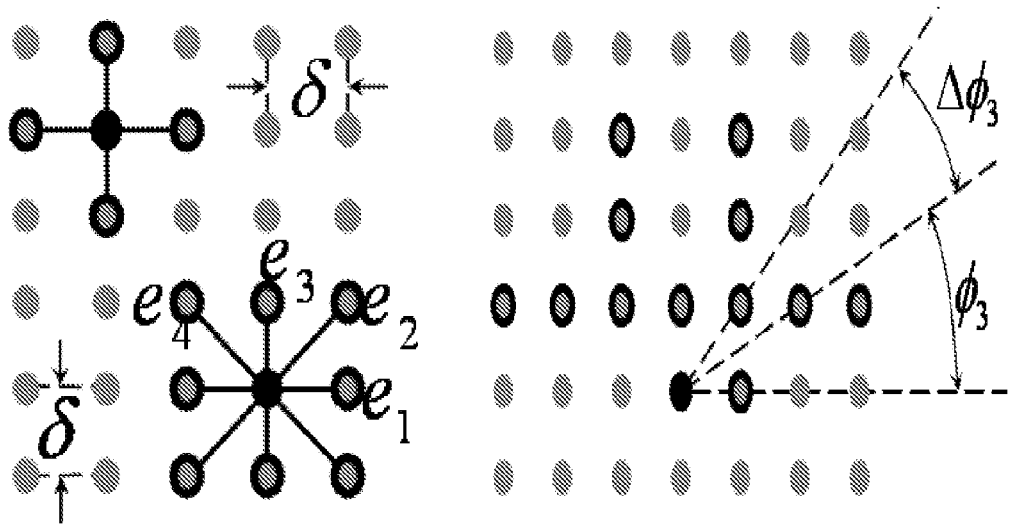

FIG. 6

SOFT EDGE SMOOTHNESS PRIOR AND APPLICATION ON ALPHA CHANNEL SUPER RESOLUTION

This application claims the benefit of U.S. Provisional Application 60/867,259 filed Nov. 27, 2006, the content of which is hereby incorporated-by-reference.

BACKGROUND

Image super resolution (SR) is a method to obtain high quality images from low resolution input images. SR is widely applicable in video communication, object recognition, HDTV, image compression, among other situations where only a low resolution image is available. Generally speaking, low resolution images are generated by smoothing and down-sampling of target scenes by low-quality image sensors. The task of recovering the original high resolution (HR) image from single low resolution (LR) image is an inverse problem of this generation procedure. Ideally, the reconstruction error (or image likelihood term) should be minimized in the process.

Back-projection, an iterative process, has been used to efficiently minimize the reconstruction error. However, this process can lose significant amounts of information during the generation process. To overcome this difficulty, image prior terms have been used to regularize the inverse problem.

Two well-known image modeling priors are image smoothness prior and edge smoothness prior. Neighboring pixels are likely to have the same color, so various filtering/interpolation algorithms (for example, bilinear algorithm or bicubic interpolation algorithm) can be used to produce smooth high resolution images. Other smoothing techniques include minimizing the image derivative. For one dimensional case, a linear closed form solution can be used. However, the image smoothness prior is not valid at region boundary, such methods tend to produce over-smoothed results, thus reducing the image quality. To preserve edge sharpness, edge directed interpolation can be used to fit smooth sub-pixel edges to the image and to prevent cross-edge interpolation. However, locating high precision edge positions can be a non-trivial task.

When performing SR using the interpolation method, the chessboard effect that occurs needs to be removed. Given the low resolution input, high resolution edge position can be located by exploring the edge spatial smoothness prior, which means that smooth curves are generally preferred without other information. One technique reconstructs smooth approximation of all of the image level-set contours simultaneously to refine the edges and remove the chessboard effect. To avoid over-smoothness, hard constraints can be introduced, they are in essential information from the image likelihood.

Another technique considers all three color channels together, and infers the high resolution curves by multi-scale tensor voting. The HR images are recovered according to the extracted curveness map by a modified back-projection iteration. Yet another technique uses snake-based vectorization to achieve smooth boundary for icon image SR. Another image modeling prior technique for SR includes using two color image prior, which means that every pixel in a local neighborhood should be one of the two representative color, or a linear combination of them. The sparse derivative prior technique has also been used.

Instead of image prior modeling, the image exemplar can be used directly. The image is typically modeled as Markov Random Fields. Various candidates for each position are selected based on the low frequency information. Spatial consistency is enforced by pair-wise interaction, mainly on the overlapping region. The final discrete optimization problem is solved by belief propagation. This method can be applied to video sequence as well such as in domain-specific video SR. Two key issues usually need to be addressed for exemplar-based method: one is to find HR candidate patch efficiently, Locality Sensitive Hashing and KD-tree has been applied to speed up the searching. This method has also been applied to image primal sketches so that they only need to do the optimization on a chain structure. Yet other learning based methods have also been applied to infer the high frequency information from mid-frequency. For example, locally linear embedding can be used to learn the high dimension manifold.

SUMMARY

In one aspect, systems and methods are disclosed for processing a low resolution image by performing a high resolution edge segment extraction on the low resolution image; performing an image super resolution on each edge segment; performing reconstruction constraint reinforcement; and generating a high quality image from the low quality image.

In another aspect which generalizes the Geocuts method, a soft edge smoothness measurement is defined as an approximation of the average length of all level lines in the image. This image prior can be applied on single image super resolution. To derive a unified treatment of all edges with different strength, a color image super resolution framework is applied. Each edge segment is decomposed by alpha matting to recover the actual color for two sides of the edge segment. The smoothness prior is integrated by super resolution on alpha channel.

In yet another aspect, the system applies a defined soft cut metric for intensity image—a generalization of a hard cut metric and then applies the alpha matting technique to solve the soft edge smoothness prior on natural color images. The metric can measure the soft edge smoothness by approximating the average length of all level lines. Adding this as the prior term for super resolution task can achieve both edge preserving and edge smoothness. The system transforms the problem of color image super resolution into a combination of alpha channel super resolution and alpha matting. A closed form alpha matting solution can be used to describe each edge segment in a unified way through the alpha channel. Color information from all three channels is utilized simultaneously.

Implementations of the above aspects may include one or more of the following. Alpha matting can be applied to get alpha channels and colors on each edge segment. The process can perform bicubic interpolation on each edge segment. The process can apply graph cuts on the bicubic interpolated data to generate a super resolution alpha channel. One or more colors can be assigned to the super resolution alpha channel. The process can derive a smooth edge prior for the low resolution image. The high resolution edge segment extraction can use one or more different size neighborhood. Different distance maps can be used. The Geocuts method can be applied to provide super resolution form a low resolution image.

Advantages of the above system may include one or more of the following. The system provides super resolution (or image hallucination) from single low resolution input image. The alpha matting technique used by the system can extract the edge by combining color information from all three channels, thus more precise results can be obtained. The system can express each edge by the alpha channel. The system can also normalize it into a unified scale and avoid the need for a parameter selection for soft edge smoothness prior. The corner point detection algorithm can help to avoid the problem of over-smoothness for corner points. The resulting images have smooth and sharp edges, which are usually preferred for better human perception. The system supports conflicting requirements that image smoothness prior prefers sharp edges while edge smoothness prior prefers spatially smooth edges. The system also integrates these two factors together in a unified way. The system can handle natural color images that show a large variety of edges with different conditions. The system can also determine edges simultaneously by using information from all three color channels. The 3D color information and edge treatment are done through a unified framework.

BRIEF DESCRIPTION OF THE DRAWINGS

FIG. 5 is an exemplary illustration of one embodiment of the graph cuts process.

FIG. 6 shows various exemplary neighborhood systems with different $n_g$.

DESCRIPTION

Figure 1:
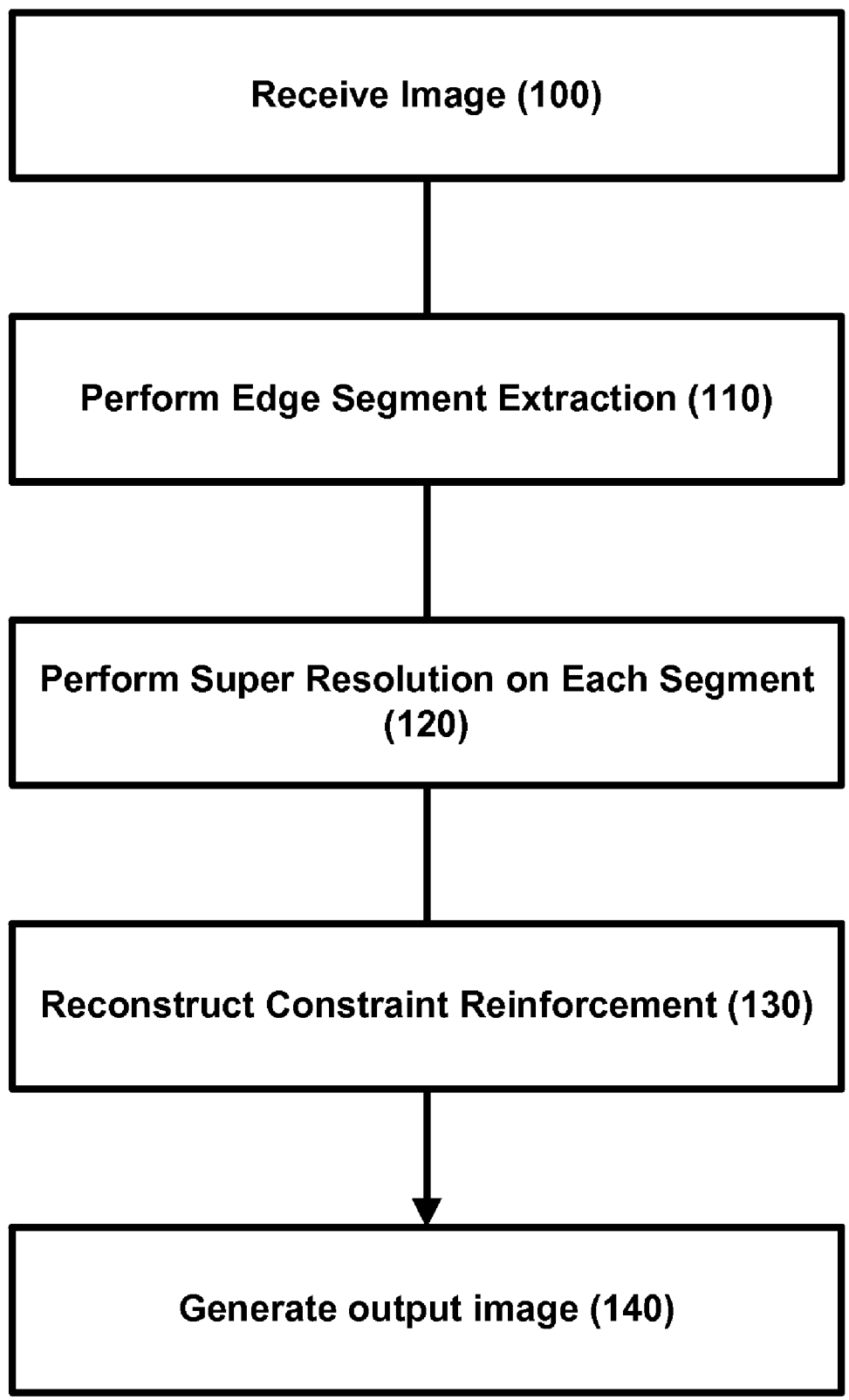
FIGS. 1-2 show an exemplary process to perform SR on an image.

FIG. 1 shows an exemplary process to perform SR on an image. First, the input image is received (100). Next, the process performs edge segment extraction (110). The process then performs SR on each segment (120). This is done by applying a defined soft cut metric for intensity image, a generalization of a hard cut metric. The metric can measure the soft edge smoothness by approximating the average length of all level lines. Adding this as the prior term for super resolution task can achieve both edge preserving and edge smoothness. The alpha matting technique is then applied to solve the soft edge smoothness prior on natural color images. The color image SR process thus can be transformed to a combination of alpha channel super resolution and alpha matting. A closed form alpha matting solution can be used to describe each edge segment in a unified way through the alpha channel. Color information from all three channels is utilized simultaneously. The process next performs reconstruction constraint re-enforcement (130). The process then generates a high resolution output image (140). The result is an output image with smooth and sharp edges, which are usually preferred for better human perception.

Figure 2:
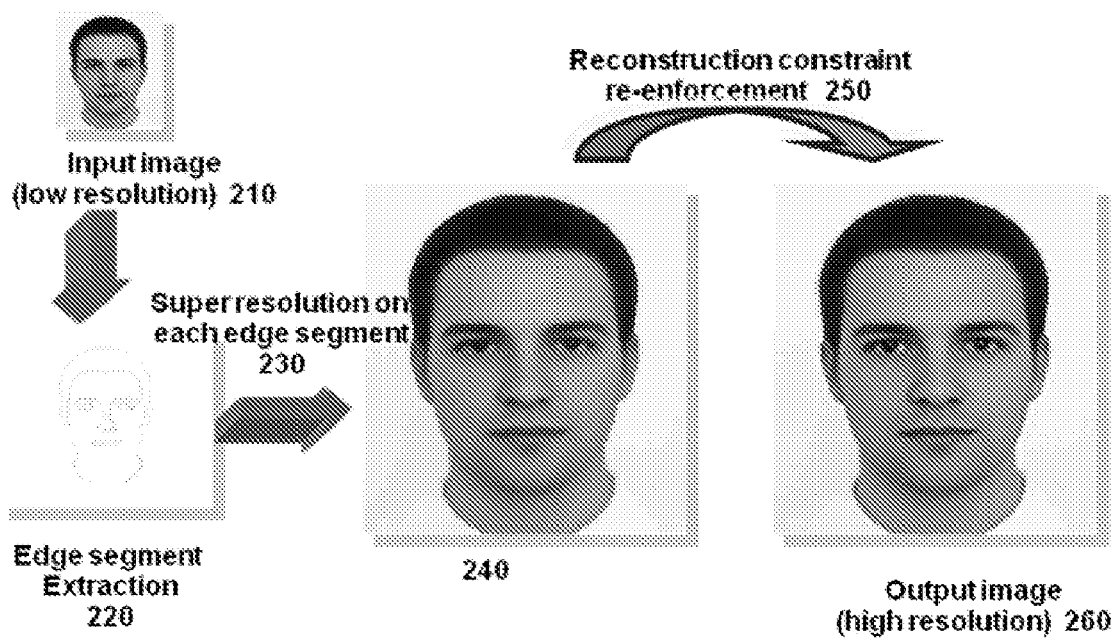

The SR process of FIG. 1 is graphically depicted in FIG. 2. As shown therein, a low resolution image is received (210). Next, an edge segment extraction of the low resolution input image of a person is done (220), and then the SR process is performed on each edge segment (230). The edges are determined simultaneously by information from all three color channels. This results in a sharpening of the outline of the picture (240). Next, a reconstruction constraint reinforcement is applied (250), resulting in a high resolution output image (260). The processes of FIGS. 1-2 integrate in a unified manner that robustly handles the requirement that image smoothness prior prefers sharp edges, and edge smoothness prior prefers spatially smooth edges. These processes explore 3D color information and treat those edges in a unified framework to efficiently and robustly handle color image SRs.

Figure 3:
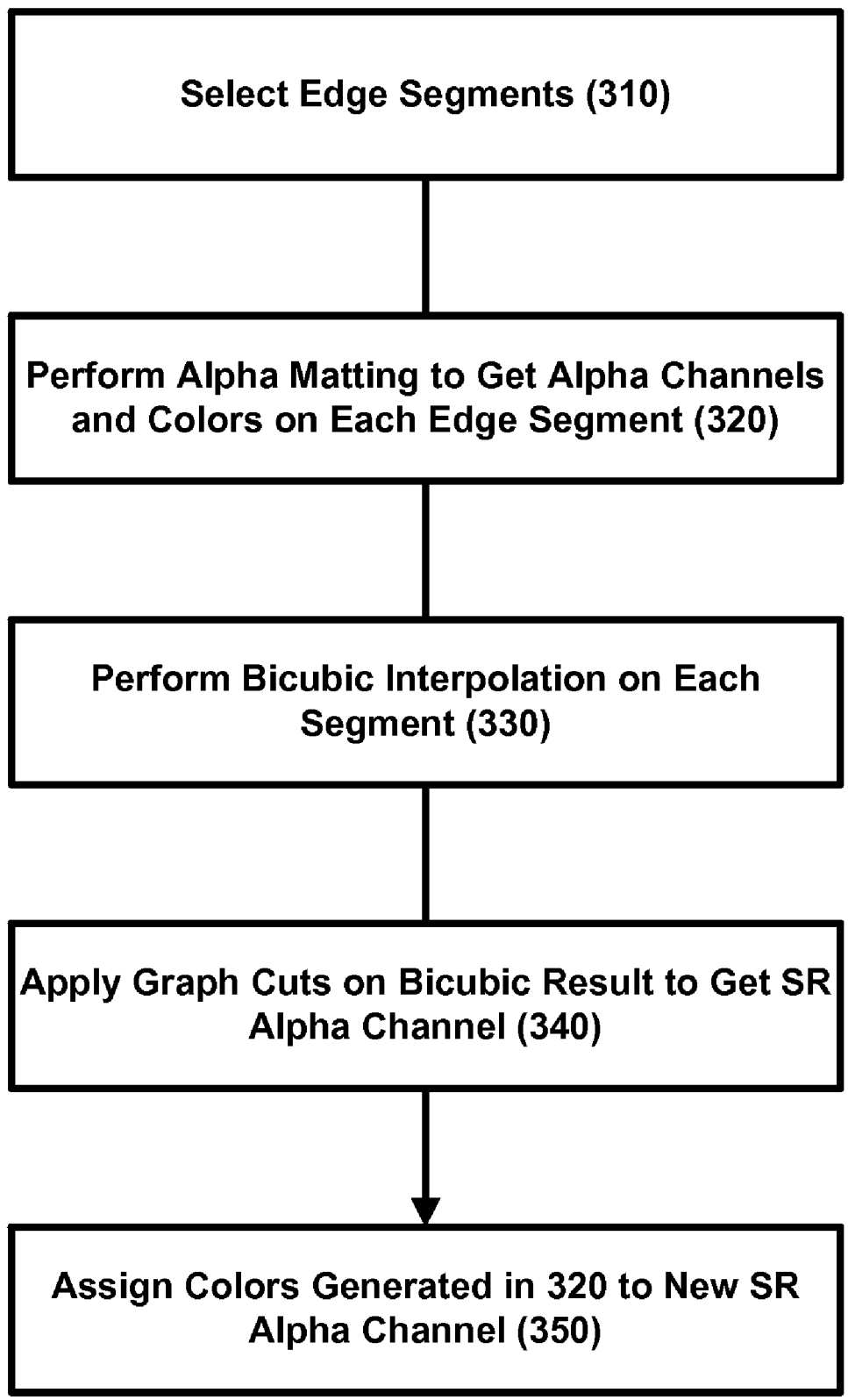
FIGS. 3-4 show one embodiment of a soft edge smoothness prior process.

FIG. 3 shows one embodiment of a soft edge smoothness prior process. First, one or more edge segments are selected (310). For each edge segment, the process performs alpha matting to get alpha channel and colors on different sides of the edge segment (320). Next, the process performs bicubic interpolation on each edge segment (330). Based on the Geocuts algorithm, the process applies graph cuts on the bicubic result to get super resolution alpha channel (340). The process then assigns the colors generated in step 320 back to the new super resolution alpha channel (350).

Figure 4:
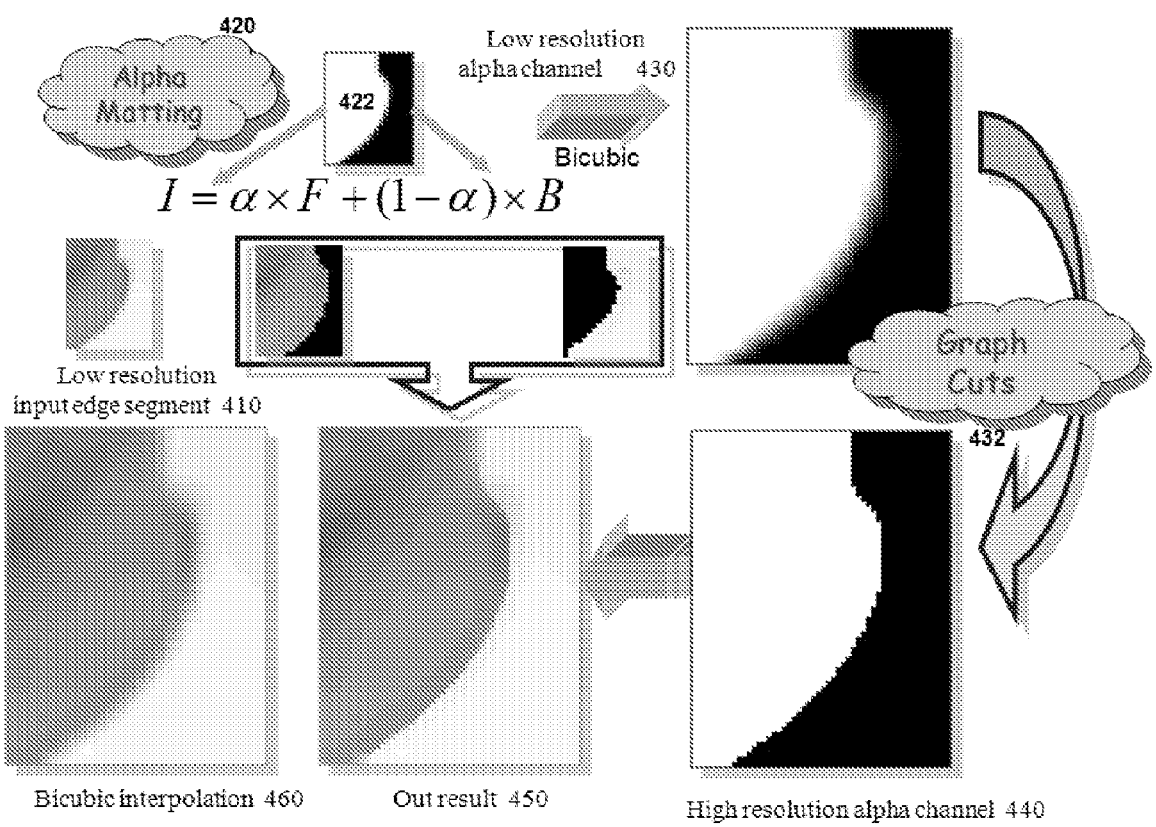

FIG. 4 shows a graphical illustration of the process of FIG. 3 in operation. First, a low resolution input edge segment is selected (410). Next, the alpha matting process is applied (420) to generate a low resolution alpha channel and a bicubic interpolation is performed on the image (430). The process applies graph cuts on the bicubic result to arrive at a high resolution alpha channel (440). The colors generated in 420 is assigned back to the new SR alpha channel to generate an output result (450). A second bicubic interpolation can be performed on the low resolution image to compare with the output result (460).

In the above embodiment, the system performs soft edge smoothness prior using the Geocuts technique. In Geocuts, given a weighted grid-graph $\mathcal{G}$ =<V, E>, and a curve C in $\mathcal{R}^2$, assume $E_C$ is the set of edges intersect with this curve. The cut metric of C is defined as $$|C|_{\mathcal{G}} = \sum_{e \in E_C} w_e, \quad (1)$$

where $w_e$ is the edge weights. It is a weighted summation of the edges that intersect C.

The Geocuts process define the neighborhood system of a regular grid $\mathcal{G}$ as a set of vectors $\mathcal{N}_{\mathcal{G}} = \{e_k | 1 \leq k \leq n_{\mathcal{G}}\}$, where $e_k$ are ordered by their correspondent angle $\phi_k$ with the +x axis, such that $0 \leq \phi_1 < \phi_2 < \ldots < \phi_{n_{\mathcal{G}}} < \pi$. Besides, $e_k$ are chosen as the k-th nearest neighbor group in $\mathcal{G}$. Some examples are shown in FIG. 6.

Assume $|C|_\epsilon$ is the Euclidean length of curve C, $\Delta\phi_k = \phi_{k+1} - \phi_k (\phi_{n_{\mathcal{G}}+1} = \pi)$, then by setting $$w_k = \frac{\delta^2 \cdot \Delta\phi_k}{2 \cdot |e_k|}, \quad (2)$$

Theorem 1 If C is a continuously differentiable regular curve in $\mathcal{R}^2$ intersecting each straight line a finite number of times then $$\mathcal{G} \to |C|_\epsilon$$

as $\delta$, $\sup_k |\Delta\phi_k|$, and $\sup_k |e_k|$ get to zero.

In another word, the length of a curve can be approximated by its cut metric. This method can be generalized into 3D, and under arbitrary Riemannian metric. The global minimum can be found in close linear time by the Graphcuts method. As its name suggested, Geocuts constructs an underlining relationship between two well-known segmentation algorithms, i.e., Geodesic active contours and Graph Cuts.

One common problem for using higher order neighborhood is the setting of the weights. One solution is to integrate the cut metric into the objective function. By doing this, the edge smoothness prior can be added, thus the metrication artifacts is minimized.

The cut metric can be defined on any set of disjoint closed curves C, or equivalently, a binary valued function $F_C(p)$ on $\mathcal{R}^2$ as follows $$F_C(p) = \begin{cases} 1 & p \text{ is inside of the curves in } C \\ 0 & \text{otherwise} \end{cases} \quad (3)$$

Then the cut metric of function $L^C$ can be expressed as follows $$|C|_\mathcal{G} = |F_C|_\mathcal{G} = \sum_{1 \leq k \leq n_\mathcal{G}} \left( w_k \sum_{e_{pq} \in N_k} |F_C(p) - F_C(q)| \right), \quad (4)$$

where $N_k$ contains all node pairs in the way k-th group of neighborhood. It is just another way to write Eqn. 1.

Instead of binary valued function on $\mathcal{R}^2$, the system can similarly define the soft cut metric for real valued function S on $\mathcal{R}^2$ with respect to grid-graph $\mathcal{G}$ as follows $$|S|_\mathcal{G} = \sum_{1 \leq k \leq n_\mathcal{G}} \left( w_k \sum_{e_{pq} \in N_k} |S(p) - S(q)| \right). \quad (5)$$

By uniformly quantizing the function values with step $$\frac{1}{n},$$

the function S can be approximately by $S_d$, which takes values from $$\left\{0, \frac{1}{n}, \frac{2}{n}, \ldots, 1\right\}.$$

The soft cut metric of $S_d$ can be similarly defined with Eqn. 5 by replacing S with $S_d$. $S_d$ can be equivalently described by a set of level lines $\mathcal{L}_1, \mathcal{L}_2, \ldots, \mathcal{L}_n$, where $\mathcal{L}_i$ is the boundary between points with $S_d$ values < and $\geq$ than $$\frac{i}{n},$$

in $\mathcal{R}^2$.

From Theorem 1, the system knows that the length of $\mathcal{L}_i$ can be approximated by its cut metric $|\mathcal{L}_i|_\mathcal{G}$. Based on this, the following theorem can be proved Theorem 2 Assume S is a continuous differentiable regular function on $\mathcal{R}^2$, which ranges in [0,1], and $S_d$ is a discrete version of S with quantization step $$\frac{1}{n},$$

then the average length of all level lines in S with respect to $$\frac{1}{n}$$

can be approximated by the soft cut metric of $S_d$, or $$|S_d|_\mathcal{G} \to \frac{1}{n} \sum_{1 \leq i \leq n} |\mathcal{L}_i|_\varepsilon \quad (6)$$

Under the Same Condition of Theorem 1

Theorem 2 can be considered as a generalization of Theorem 1 and is applicable to soft segmentation instead of binary segmentation. The theorem implies that by minimizing the soft cut metric, the length summation of discrete level lines can be minimized, thus a smoothness prior for soft edge can be integrated.

Next, the application of the above theorems on super resolution will be discussed. The generation process of LR image can be described by a combination of atmosphere blur, motion, camera blur, and down-sampling. The system simplifies the effect of the first 3 factors by assuming a single filter G for the entire image, and then it can be formulated as follows $$I^l = (I^h * G) \downarrow, \quad (7)$$

where $I^h$ and $I^l$ are the HR and LR images, respectively, G is a spatial filter, * is the convolution operator, and $\downarrow$ is the down-sampling operator. The soft cut metric is directly applicable to the problem of SR, by defining the objective function as $$I_h = \arg\min_I \left( E_l(I_l, I) + \lambda |I|_\mathcal{G} \right), \quad (8)$$

where $$E_l(I_l, I) = \|I_l - (I * G) \downarrow\|_2^2$$

is the likelihood term. It is based on $L_2$ distance between the given LR image $I_l$ and synthesized LR image by I. $|I_s$ is the smoothness prior term for soft edge defined by Eqn. 5. $\lambda$ is a parameter to balance these two term.

Different norms can be used for likelihood and prior terms for the following reasons:

1. The $L_2$ distance is used for likelihood term since it punishes more on large reconstruction error than L1.

2. Although L2 distance makes no difference for defining cut metric for hard edge, Theorem 2 will not hold any more. 3, Besides, minimizing L2 norm for gradient is not edge preserving, considering a 1D case will help understand this property. L2 norm usually lead to a graduate transition across edges, especially for the case with only one LR input image.

The system optimizes this problem by steepest decent algorithm. By putting the same group of neighborhood together, it can be implemented in a very efficient way. For color image, in this section, the system simply applies its methods on three color channels separately.

FIG. 5 is an exemplary illustration of one embodiment of the graph cuts process. In FIG. 5, an effective edge smoothness prior is necessary for image super resolution due to its under-determined nature. However, it is generally difficult to have analytical forms to evaluate the edge smoothness, especially for soft edges that exhibit gradual intensity transition. In FIG. 5, a soft edge smoothness metric is defined on a large neighborhood system which is an approximation of the average length of all level lines in the image based on the geocuts method. In general, a larger number of neighborhoods would generate smoother boundaries.

FIG. 6 shows an exemplary neighborhood system for $n_g = 2$ and $n_g = 8$ (left) and $n_g = 20$ (right, the highlighted pixels are neighbors of the pixel marked by X. For clarity, only neighbors in the first quadrant are shown.

Figure 7:
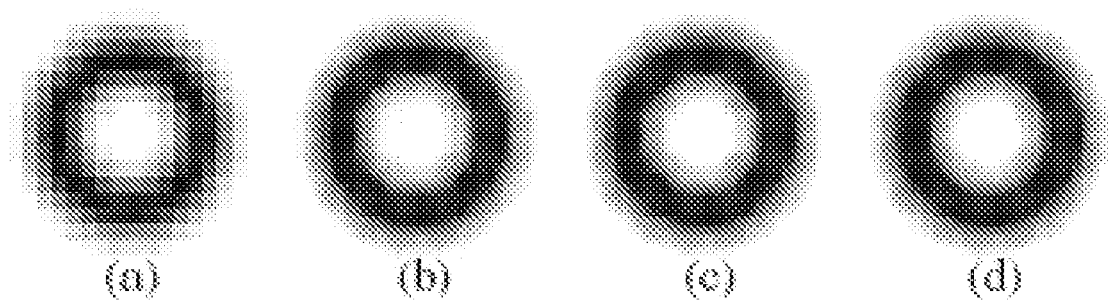
FIG. 7(a) shows an exemplary LR input image, while FIGS. 7(b) (c) and (d) show exemplary SR results with soft edge smoothness prior when $n_g$ =2, 4, 20, respectively.

FIGS. 7a-7d illustrate the necessity for using higher order neighborhood. FIG. 7(a) shows the LR input image. FIGS. 7(b) (c) and (d) are the SR results with soft edge smoothness prior when $n_g = 2, 4, 12$, respectively. Metrication effect can be observed for small $n_g$. There are some 45° artifacts in FIG. 7(c), since an 8-neighborhood system is used for it.

Figure 8:
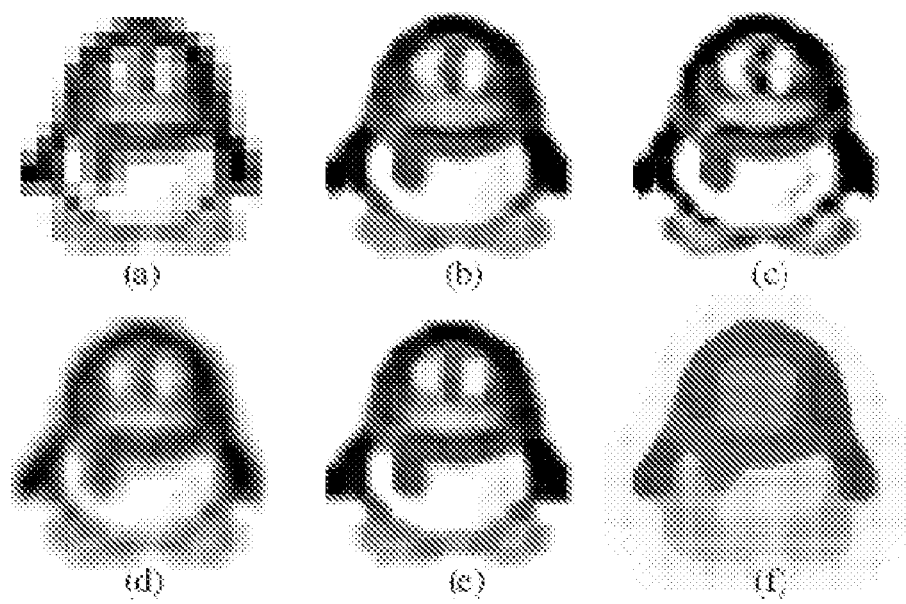
FIGS. 8a-8f compare images formed by different parameter settings.
Figure 9:
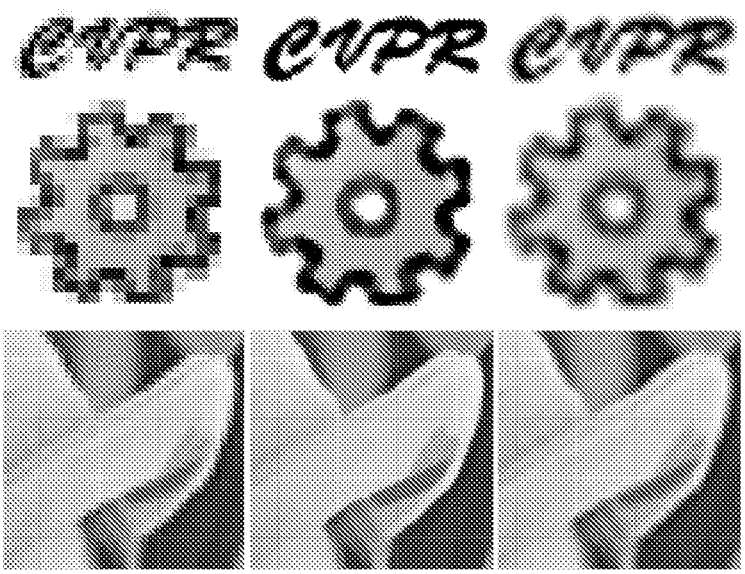
FIG. 9 shows the results of enforcing soft edge smoothness prior on a region near a corner point.

FIGS. 8a-8f compare images formed by different parameter settings. In FIG. 8(a), an LR input image (20×20) is used. In FIG. 8(b), $\lambda=0.01$, $n_g=12$. In FIG. 8(c), $\lambda=0.001$, $n_g=12$. FIG. 8(d) shows a bicubic interpolation result, while FIG. 8(e) uses $\lambda=0.01$, $n_g=2$, (f) $\lambda=0.1$, $n_g=12$. A larger $n_g$ is applied in (b) than in (e), thus smoother boundary is produced. In (c), the system uses a smaller $\lambda$ than in (b), thus more weight is put on data fitting term, this makes the result look over-sharpened. In (f), larger $\lambda$ is used than in (b), the edge smoothness prior is over stressed, all boundaries are very smooth, but the result is blurry. Generally speaking, the effect of the parameters can be summarized as follows: 1, larger $n_g$ will produce smoother boundary, but more computational demanding. In all the later experiments, $n_g$ is set to 20, which is shown in the right part of FIG. 6, the value of $\lambda$ is important—small $\lambda$ may result in over-sharpened image, while large $\lambda$ may result in over-smoothed result. In fact, there is another parameter which can also influence the result, which is the filter G in the generation model (Eqn. 7). However, estimating G is out of the scope of this paper, the system fixes it as a Gaussian filter with $\sigma=2$ throughout this paper. More results are shown in FIG. 9 for different cases and these images show that the instant algorithm can produce nice result even for an LR image with poor quality. The benefit of the system's algorithm is that the system has an explicit objective function integrating both prior and likelihood terms and there is an exact geometry explanation for the result.

For natural color image SR, three reasons limit the performance of applying soft edge smoothness prior directly by simply processing each color channels separately on the entire image:

Exact edge position is determined by the color information from all three channels as a whole. Decisions made on each channel separately might be wrong and inconsistent with each other.

SR by soft edge smoothness prior is sensitive to the value of $\lambda$, which is related to the actually edge strength. Take the 3$^{rd}$ image in FIG. 9 as an example, some weak edges are smoothed out with this set of parameters, while in fact, they can be perfectly extracted by smaller $\lambda$ in the experiments. Some edge strength normalization mechanism is needed to make possible a unified treatment of all edges.

Enforce soft edge smoothness prior on region near corner point will produce undesired smoothed curve, which is also observable in FIG. 9.

These issues are solved by the process of FIG. 1 that provides natural color image SR handling. The pseudo code for this is as follows:
Input LR image $I^l$ and scale factor s.
Output HR image $I^h$
1. Edge segment extraction and region assignment to get $\{c_i\}$ and $\{P_i\}$.
2. For each segment $c_i$, process $P_i$ as follows
Compute $\mathcal{F}^l$, $\mathcal{B}^l$ and $\alpha^l$ from $I^l$ by a closed form alpha matting solution.
Alpha channel SR to get $\alpha^h$ from $\alpha^l$ by single channel SR with soft edge smoothness prior.
Synthesize the HR patch by $\mathcal{F}^l$, $\mathcal{B}^l$ and $\alpha^h$.
3. Reinforce the reconstruction constraint for the entire image by back-projection.

In one embodiment, a standard canny edge detection algorithm is used to extract continues edges. A robust corner detection algorithm based on curvature scale space is applied. These corner points can break the edges into segments. Each edge segment $\mathcal{C}_i$ is a continuous curve (maybe closed), and a exclusive nearby patch $\mathcal{P}_i$ is assigned to it by watershed algorithm on image gradient.

The system processes each edge segment at $\mathcal{P}_i$ separately. For each extract edge segment, if they system considers the two sides of this edge as foreground and background, the problem can be reduced to the alpha matting problem. Thus the true colors for two sides of the edge can be recovered by a closed form solution. The LR input is a blending of these two through an alpha channel, which ranges in [0, 1]. The entire alpha matting part is processed on low resolution. After that, super resolution based on soft edge smoothness prior is used to generate the HR alpha channel give the LR alpha channel extracted by alpha matting. The HR alpha channel is combined with the LR patches of two sides of the edge to generate the HR image. In the end, back-projection is used to enforce the reconstruction constraint for region without salient edge segment.

The alpha matting technique can extract the edge by combining color information from all three channels, thus more precise results can be obtained. The process also expresses each edge by the alpha channel and can normalize it into a unified scale to avoid the need for a parameter selection for the soft edge smoothness prior. Further, the corner point detection algorithm can help to avoid the problem of over-smoothness for corner points.

Alpha matting is a technique to decompose an image into a linear combination of foreground image and background image through an alpha channel. It is an important problem in computer graphics to extract the foreground object for image editing. Ideally, the influence of the neighboring background color should be removed. Assume the foreground and background images are F and B, then the following equation should hold for each pixel p $$I_p = \alpha_p F_p + (1-\alpha_p) B_p, \quad (9)$$

where $\alpha_p$ is the foreground opacity of pixel p, which takes value in [0, 1]. Given the blended image I, solving for F, B, and $\alpha$ is also an under-determined inverse problem.

Similarly, an HR step edge can also be considered as a combination of two smooth patches through a weight channel $\alpha$ as follows $$I^h = \alpha^h I_L^h + (1-\alpha^h) I_R^h, \quad (10)$$

where $I_L^h$ and $I_R^h$ represent the actual image color for two sides of the edge at HR. Then by Eqn. 7, the corresponding LR image can be expressed as follows, $$I^l = (\alpha^h I_L^h + (1-\alpha^h)I_R^h) * G \downarrow \qquad (11)$$

$$\simeq (\alpha^h * G)\downarrow I_L^h \downarrow + (1-(\alpha^h * G)\downarrow)I_R^h \downarrow.$$

The approximate equality can be taken if one assumes that both $I_L^h$ and $I_R^h$ are locally smooth, which is reasonable for the SR task. By assuming $\alpha=(\alpha^h*G)\downarrow$, $F=I_L^h\downarrow$, and $B=I_R^h\downarrow$, Eqn. 12 will be exactly the same as Eqn. 9. It means that the system can do alpha matting for $I^l$, to get $(\alpha^h*G)\downarrow$, $I_L^h\downarrow$, and $I_R^h\downarrow$, then $\alpha^h$, $I_L^h$, $I_R^h$ can be recovered accordingly from them. Recover $\alpha^h$ from $\alpha^l=(\alpha^h*G)\downarrow$ is exactly the problem that previous discussed, while $I_L^h$ and $I_R^h$ can be interpolated with the bicubic method given their down-sampled version due to the smoothness assumption for them.

By assuming that both F and B satisfy a locally linear model approximately, a regularity term is incorporated. Thus a closed form solution can be derived. Hard constraint can be easily enforced into the cost function. When the system applies this method in an image region $R_i$, the hard constraint for both sides is chosen by analyzing the local topology and image gradient. Pixels with low local contrast were selected, since they correspond to pure color of one side. The alpha matting algorithm robustly handles the sample images discussed below, even for very limited quantity of hard constraint.

Alpha matting can be used where the α value is extracted to get the sub-pixel location of the curve. A two color image prior has also been used for demosaicing, which assume that each pixel within a local neighborhood is either one of two representative colors or a linear combination of them. This assumption is in essential quite similar to the idea of using alpha matting for SR.

Figure 10:
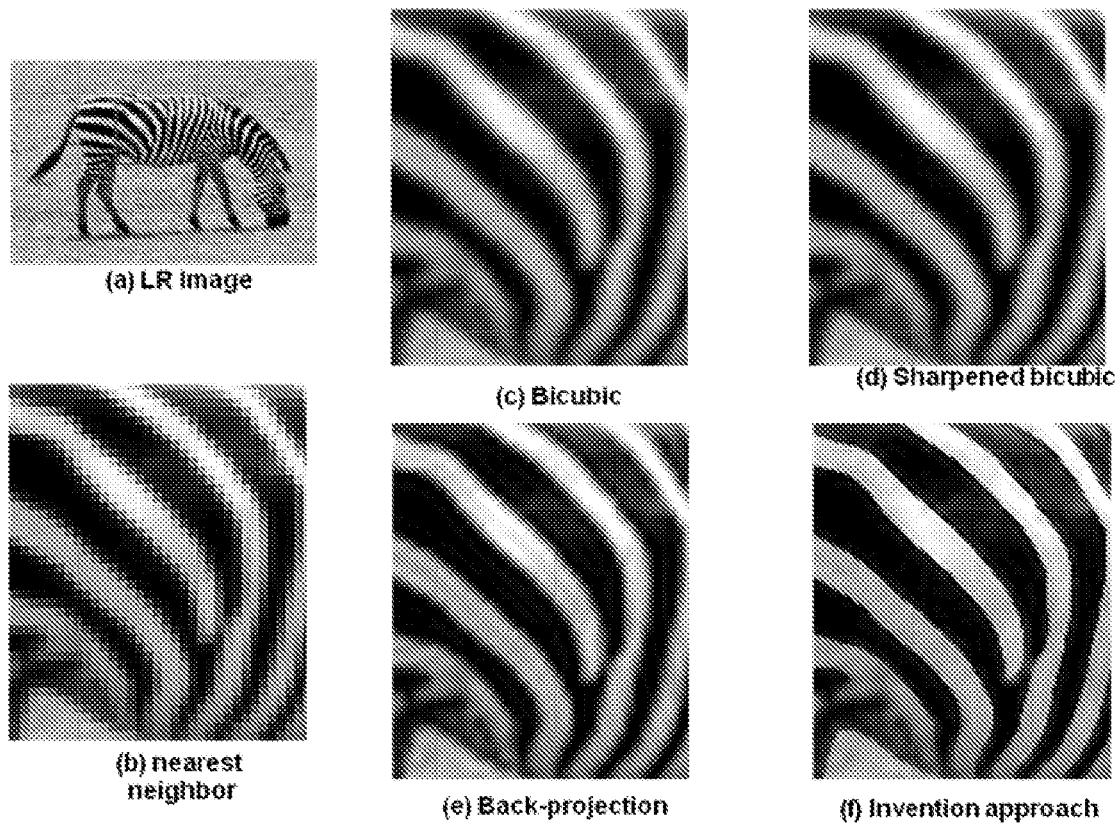
FIGS. 10a-10f show exemplary results of image patches.

FIG. 10 shows a zoom in result of an image patch. Bicubic interpolation produces a blurry result. Sharpened bicubic is the result given in Photoshop, it is better than bicubic, but still blurry, and the chessboard effect exists. (d) is the result of back-projection with bicubic result as the initial input. The chessboard effect and ringing effect can be clearly observed. The system's approach produces clear and smooth edges.

Figure 11:
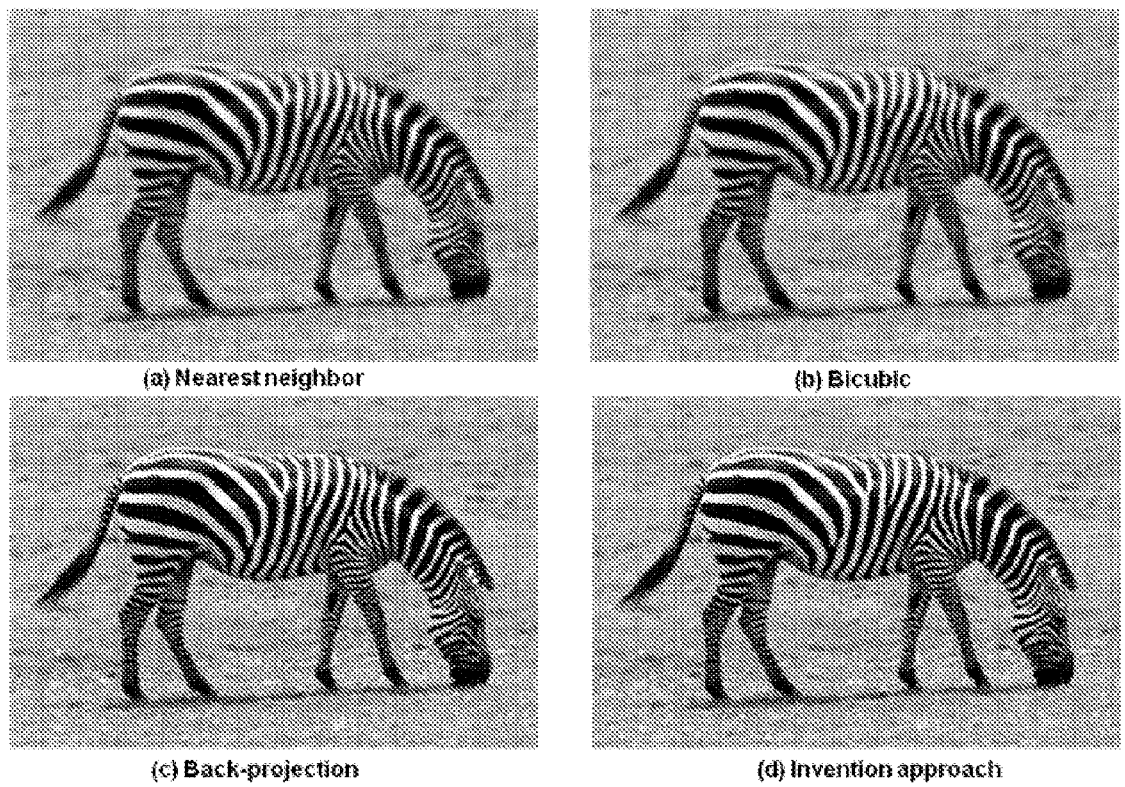
FIG. 11 shows the result of the entire image of FIG. 10(a).
Figure 12A:
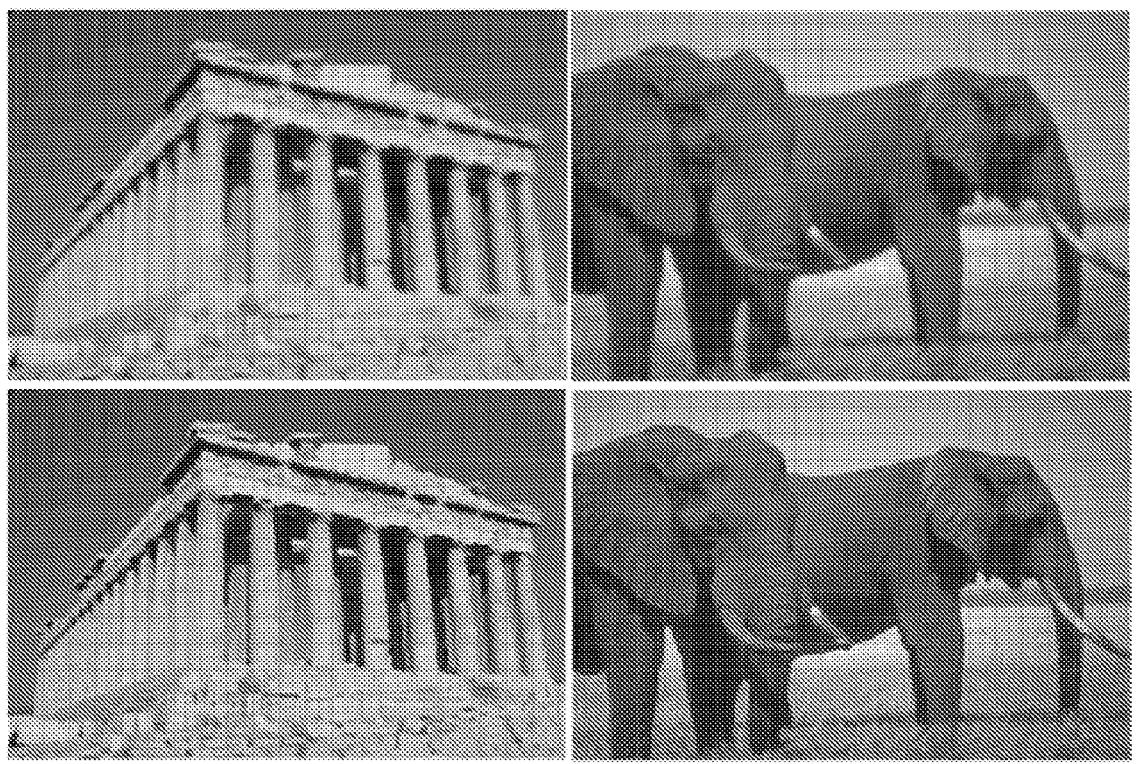
FIGS. 12A-12C shows experimental results on various categories of images, including animals, natural scene, human faces, and computer graphics.
Figure 12B:
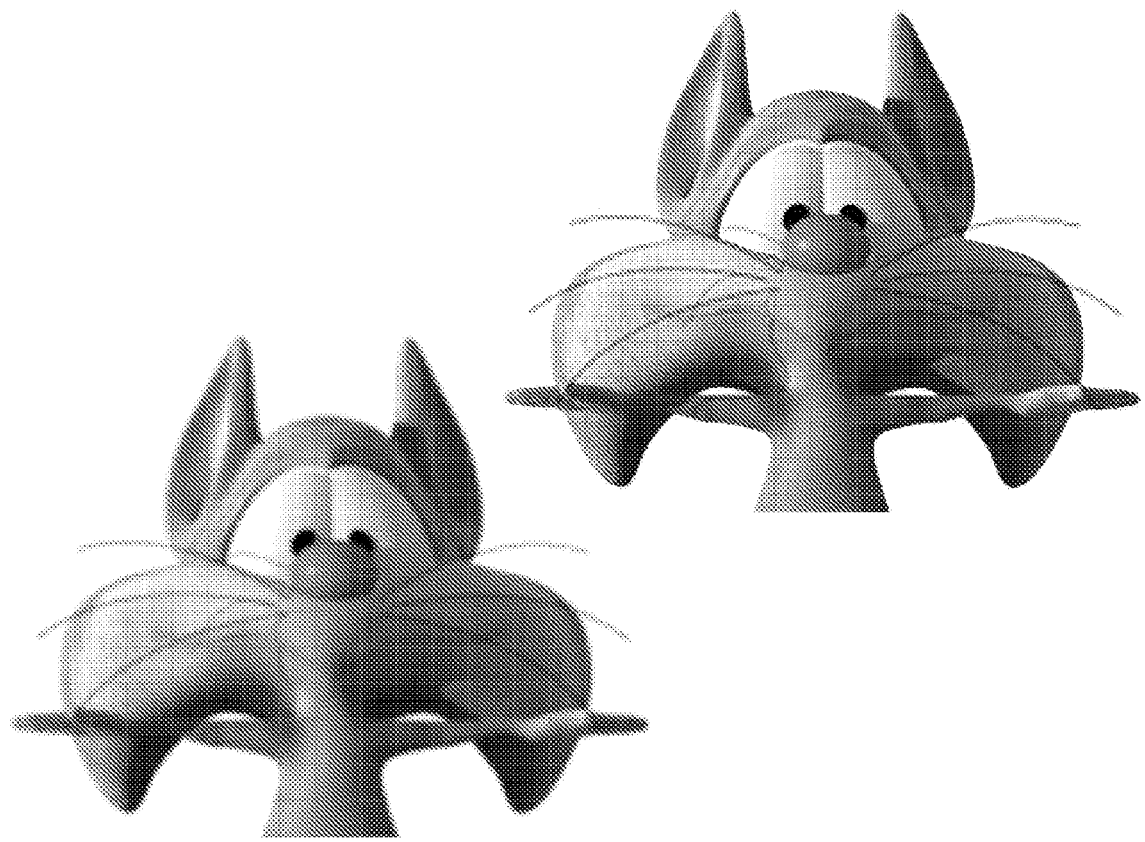
Figure 12C:

FIG. 11 shows the result of the entire image of FIG. 10(a), our method gives the most perceptually appealing result. More experiments on various categories of images are shown in FIGS. 12A-12C, including animals, natural scene, human faces, and computer graphics.

Table 1 shows error reduction results as compared with bicubic interpolation. The zoom factors in the system's experiments were set to 3. $n_G$, and $\lambda=0.01$ are used for alpha channel SR. The experiments were done on a PIV3.4G PC with 2G RAM with Matlab. Typically, the PC took 1-2 minutes for an LR input image with size 160×120, depending on the edge density.

TABLE 1

Error reduction compared with bicubic interpolation

| | image size | bicubic error | our error | reduction (%) |
|---|---|---|---|---|
| zebra | 686 × 392 | 17.60 | 13.62 | 22.61 |
| elephant | 480 × 320 | 9.48 | 7.99 | 15.72 |
| temple | 480 × 320 | 16.05 | 14.19 | 11.59 |

TABLE 1-continued

Error reduction compared with bicubic interpolation

| | image size | bicubic error | our error | reduction (%) |
|---|---|---|---|---|
| chars | 512 × 512 | 24.98 | 18.78 | 24.82 |
| face | 320 × 480 | 7.76 | 5.88 | 24.23 |
| cartoon | 738 × 768 | 10.66 | 7.90 | 25.89 |

In sum, the exemplary system provides a highly effective single image super resolution algorithm. A soft edge smoothness prior is defined on a large neighbored system, which is an approximation of the average length of all level lines in the image. To handle natural color image SR, a closed form alpha matting algorithm is employed to decompose each edge, thus makes possible a unified treatment for all edge segments. The system provides visually appealing results for wide variety of images.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method to process a low resolution image, comprising:
   a. capturing the low resolution image from an image sensor:
   b. performing a high resolution edge segment extraction on the low resolution image;
   c. performing an image super resolution on each edge segment;
   d. performing reconstruction constraint reinforcement;
   e. generating a high quality image from the low quality image; and
   f. rendering the high quality image on paper or a screen.

2. The method of claim 1, comprising performing alpha matting to get alpha channels and colors on each edge segment.

3. The method of claim 1, comprising performing bicubic interpolation on each edge segment.

4. The method of claim 1, comprising applying graph cuts on the bicubic interpolated data to generate a super resolution alpha channel.

5. The method of claim 4, comprising assigning one or more colors to the super resolution alpha channel.

6. The method of claim 1, comprising deriving a smooth edge prior for the low resolution image.

7. The method of claim 6, wherein the smooth edge prior comprises $I=\alpha \times F+(1-\alpha) \times B$.

8. The method of claim 1, wherein the high resolution edge segment extraction comprises using one or more different size neighborhood.

9. The method of claim 1, comprising getting different distance maps.

10. The method of claim 1, comprising applying the Geocuts method.

11. The method of claim 1, comprising applying a defined soft cut metric for intensity image.

12. The method of claim 1, comprising applying an alpha matting technique to provide a soft edge smoothness prior on natural color images.

13. The method of claim 1, comprising measuring a soft edge smoothness by approximating an average length of one or more level lines.

14. The method of claim 13, comprising adding the soft edge smoothness as a prior term for super resolution to achieve edge preservation and edge smoothness.

15. The method of claim 1, comprising transforming color image super resolution into an alpha channel super resolution and alpha matting.

16. The method of claim 1, comprising using a closed form alpha matting solution to describe each edge segment in a unified way through the alpha channel.

17. The method of claim 16, wherein color information from a plurality of channels is utilized simultaneously.

18. The method of claim 1, comprising performing edge segment extraction and region assignment to get $\{c_i\}$ and $\{P_i\}$.

19. The method of claim 18, for each segment $c_i$, processing $P_i$ to:
   compute $\mathcal{F}^l$, $\mathcal{B}^l$ and $\alpha^l$ from $I^l$ by a closed form alpha matting solution,
   perform alpha channel SR to get $\alpha^h$ from $\alpha^l$ by single channel super resolution with soft edge smoothness prior; and
   synthesize a high resolution patch by $\mathcal{F}^l$, $\mathcal{B}^l$ and $\alpha^h$.

20. The method of claim 19, reinforcing a reconstruction constraint for an image by back-projection.

21. The method of claim 1, comprising applying a canny edge detection method to extract continues edges.

22. The method of claim 1, comprising applying a corner detection method based on curvature scale space is applied.

23. The method of claim 22, comprising breaking one or more edges into segments.

* * * * *